United States Patent
Chiu et al.

(10) Patent No.: US 7,447,423 B2
(45) Date of Patent: Nov. 4, 2008

(54) FAN SPEED CONTROL DEVICE AND METHOD DETAILED DESCRIPTION OF THE INVENTION

(75) Inventors: Chun-Lung Chiu, Taoyuan Hsien (TW); Ming-Shi Tsai, Taoyuan Hsien (TW); Wen-Shi Huang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 195 days.

(21) Appl. No.: 11/606,089

(22) Filed: Nov. 30, 2006

(65) Prior Publication Data

US 2007/0133956 A1    Jun. 14, 2007

(30) Foreign Application Priority Data

Dec. 8, 2005    (TW) .............................. 94143294 A

(51) Int. Cl.
  *G05F 1/10*    (2006.01)
(52) U.S. Cl. ..................... 388/822; 388/907.5; 318/461
(58) Field of Classification Search .................. 388/822, 388/806, 907.5; 318/432, 433, 461, 465
See application file for complete search history.

(56) References Cited

U.S. PATENT DOCUMENTS 6,453,853 B1 *    9/2002    Hawkins et al. .......... 123/41.12

* cited by examiner

*Primary Examiner*—Karen Masih
(74) *Attorney, Agent, or Firm*—Birch, Stewart, Kolasch & Birch, LLP

(57) ABSTRACT

A fan speed control device includes a controller, a switch and a voltage regulator. The controller detects a rotation speed signal of the fan to generate a first driving signal when the rotation speed signal is relatively higher than a predetermined rotation speed signal and generates the first driving signal and a second driving signal when the rotation speed signal is relatively lower than the predetermined rotation speed signal. The switch is electrically connected with the controller and receives the first driving signal. The voltage regulator, which is electrically connected with the controller, the switch and the fan, receives the second driving signal, and controls the rotation speed of the fan in accordance with the first driving signal and the second driving signal.

20 Claims, 6 Drawing Sheets

FAN SPEED CONTROL DEVICE AND METHOD DETAILED DESCRIPTION OF THE INVENTION

CROSS REFERENCE TO RELATED APPLICATIONS

This Non-provisional application claims priority under 35 U.S.C. §119(a) on Patent Application No(s). 094143294 filed in Taiwan, Republic of China on Dec. 8, 2005, the entire contents of which are hereby incorporated by reference.

BACKGROUND OF THE INVENTION

1. Field of Invention

The invention relates to a rotation speed control device and method, and, in particular, to a rotation speed control device and method for controlling the rotation speed of a fan.

2. Related Art

Most electronic systems are equipped with a fan for heat dissipation so as to prevent some elements in the electronic systems from being over-heated and producing glitches.

As shown in FIG. 1, a conventional fan 1 includes a motor 11. If the motor 11 is a DC brushless motor, the rotation speed and voltage $V_M$ of the motor 11 are directly proportional. To control the rotation speed of the fan 1, the motor 11, which is electrically connected with the power source $V_{CC}$, may further couple to a linear voltage regulator 12 so as to change the voltage of the motor 11. By changing the voltage $V_T$ of the linear voltage regulator 12, the voltage $V_M$ of the motor 11 as well as the rotation speed of the fan 1 can be controlled. In more detailed, the voltage $V_M$ of the motor 11 equals to the power source $V_{CC}$ minus the voltage $V_T$ of the linear voltage regulator 12 ($V_M=V_{CC}-V_T$). For example, when the voltage $V_T$ of the linear voltage regulator 12 increases, the voltage $V_M$ of the motor 11 decreases resulting in the slowed rotation speed of the fan 1. However, although the above-mentioned control method can easily change the rotation speed of the fan 1 by changing the voltage $V_T$ of the linear voltage regulator 12, it may cause the increased power consumption. In addition, since the linear voltage regulator 12 is constantly working and changing voltage, it generates heat easily and the heat is not easily dissipated.

To improve the above-mentioned disadvantage, as shown in FIG. 2, another conventional fan 2 includes a motor 21 electrically connected with the power source $V_{CC}$ and a power switch element 22. A PWM (pulse width modulation) signal is inputted to control the active/inactive period of the power switch element 22. For example, when the duty cycle of the PWM signal has a longer high-level period, the power switch element 22 has longer active period so that the rotation speed of the fan 2 becomes faster. That is, the electronic system utilizes the periods of the high level and low level of the PWM signal to control the period of ON or OFF of the power switch element 22. However, the noise caused by the switching of the power switch element 22 is obvious when the fan 2 is at a low rotation speed. As shown in FIG. 3, the switching of the fan 2 may lead to the rapid changes of the voltage ($\Delta V$) and the current variations per unit time (di/dt), which results in higher electromagnetic interference.

Therefore, it is desired to provide a fan speed control device and method, which can decrease the power consumption, reduce the noise of switching, and avoid electromagnetic interference.

SUMMARY OF THE INVENTION

In view of the foregoing, the invention is to provide a fan speed control device and a fan speed control method, which can decrease the power consumption, reduce the noise of switching, avoid electromagnetic interference, and dissipate heat more efficiently.

To achieve the above, the invention discloses a fan speed control device comprising a controller, a switch, and a voltage regulator. The controller detects a rotation speed signal of the fan for generating a first driving signal when the rotation speed signal is relatively higher than a predetermined rotation speed signal and generating the first driving signal and a second driving signal when the rotation speed signal is relatively lower than the predetermined rotation speed signal. The switch is electrically connected with the controller and receives the first driving signal. The voltage regulator, which is electrically connected with the controller, the switch and the fan, receives the second driving signal, and controls the rotation speed of the fan in accordance with the first driving signal and the second driving signal.

To achieve the above, the invention also discloses a fan speed control device. The fan speed control device includes a controller for detecting a rotation speed signal of a fan. The controller controls a rotation speed of the fan in accordance with a first driving signal when the rotation speed signal is relatively higher than a predetermined rotation speed signal. In addition, when the rotation speed signal is relatively lower than the predetermined rotation speed signal, the controller controls the rotation speed of the fan in accordance with the first driving signal and a second driving signal.

To achieve the above, the invention discloses a fan speed control method, which comprises the following steps of: detecting a rotation speed signal of a fan by a controller; determining whether the rotation speed signal is relatively higher than or lower than a predetermined rotation speed signal; controlling a rotation speed of the fan in accordance with a first driving signal by the controller when the rotation speed signal is relatively higher than the predetermined rotation speed signal; and controlling the rotation speed of the fan in accordance with the first driving signal and a second driving signal by the controller when the rotation speed signal is relatively lower than the predetermined rotation speed signal.

As mentioned above, the fan speed control device and method of the invention combine a voltage control and a pulse width modulation (PWM) control. In other words, a voltage regulator and a switch are provided in series between a motor of the fan and the power source, and a controller is used to control the voltage regulator and switch. When the rotation speed of the fan is faster, the switch is controlled with a pulse width modulation signal for controlling the rotation speed of the fan. In this case, because the wind sound generated by the rotated fan is louder, the switching of the switch is not obvious and won't enlarge the noise. When the rotation speed of the fan is slower, the pulse width modulation signal is fixed, and the voltage regulator is controlled with a voltage signal for further lowering the rotation speed of the fan. In this case, because the voltage and current of the switch are small and are constant, the noise caused by the switching of the switch can be decreased, and the electromagnetic interference can be greatly reduced. Then, the voltage regulator is enabled. Since small a voltage is capable of changing the rotation speed of the fan, the power consumption can be reduced and the heat-dissipating problem of the voltage regulator can be solved.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
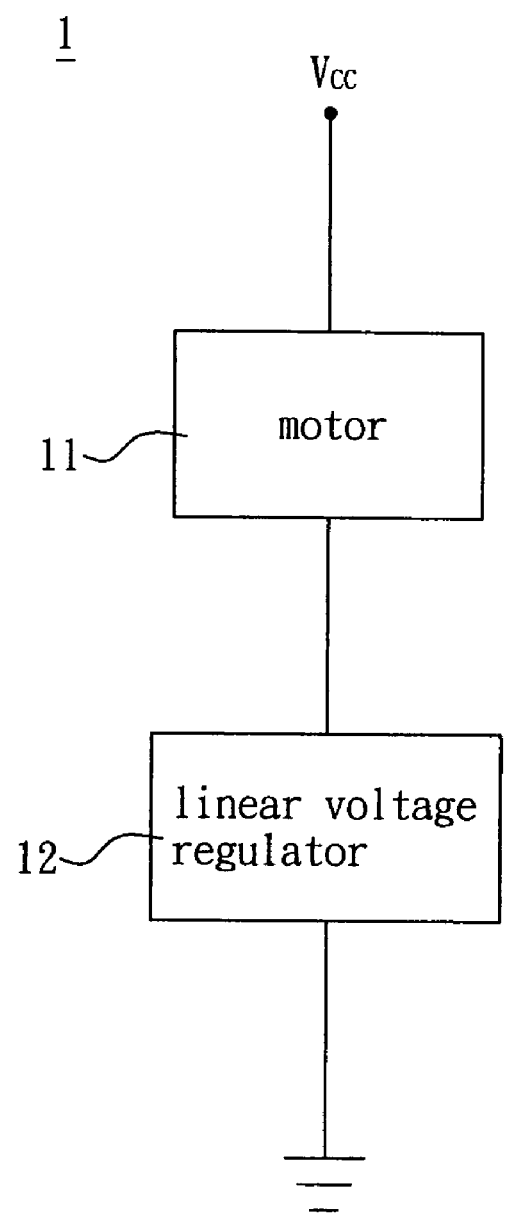
FIG. 1 is a schematic diagram showing the conventional fan using a linear voltage method to control the rotation speed.
Figure 2:
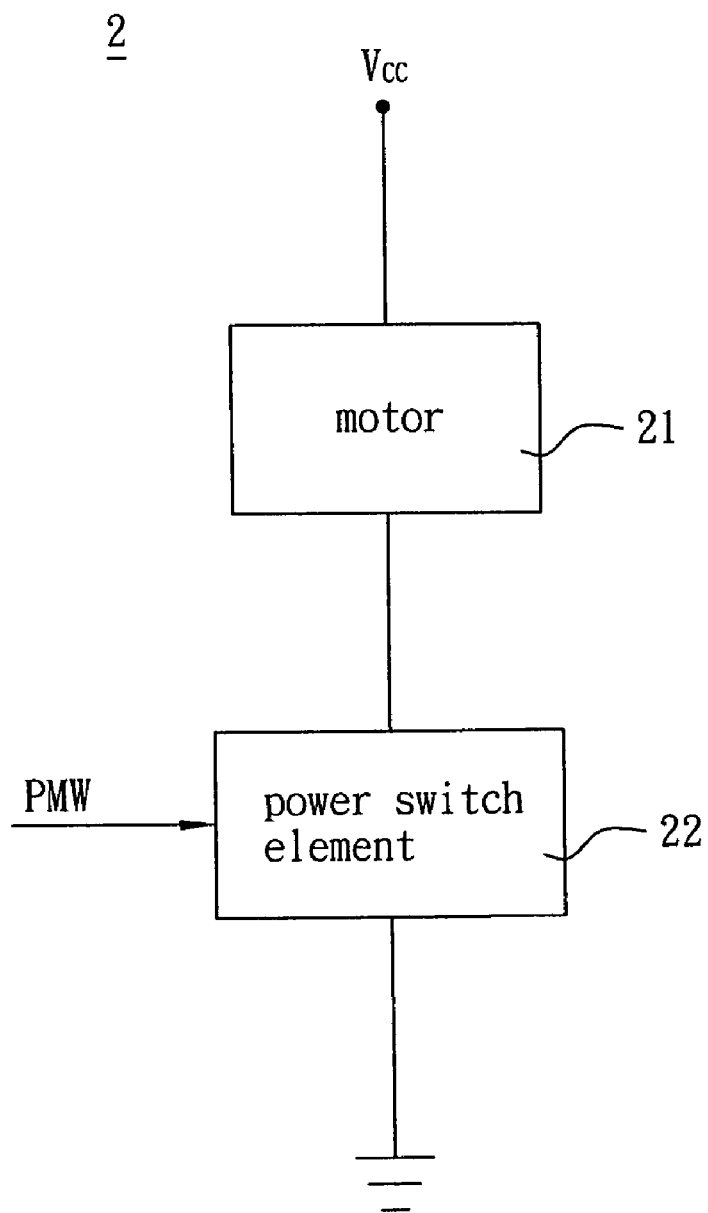
FIG. 2 is a schematic diagram showing the conventional fan using a pulse width modulation method to control the rotation speed.
Figure 3:
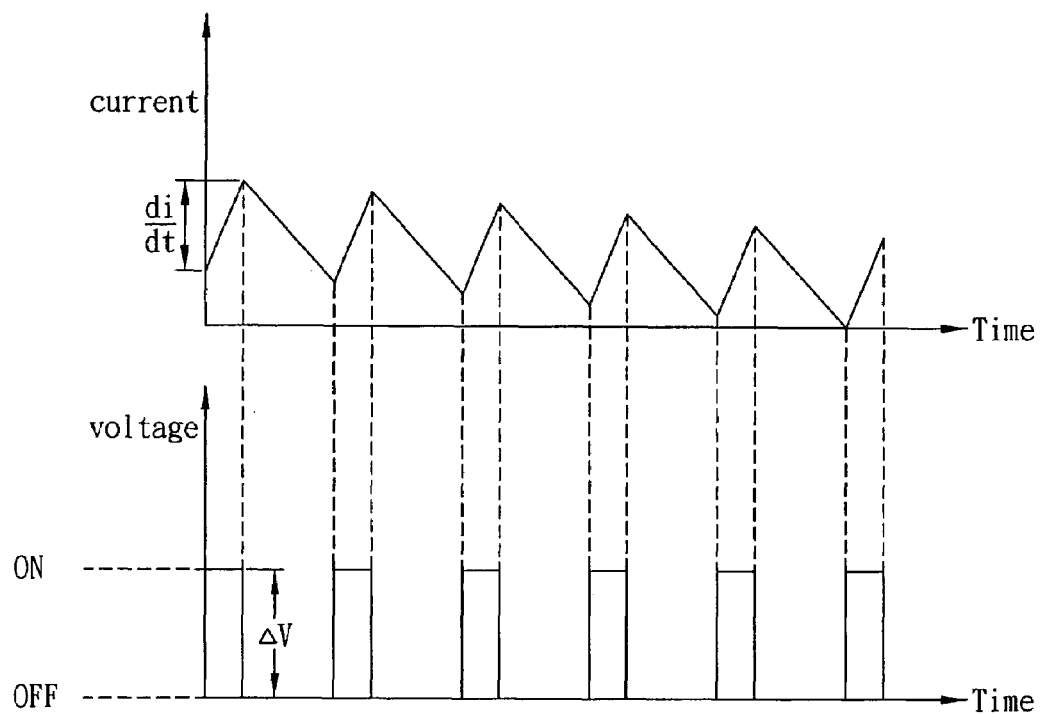
FIG. 3 is a schematic diagram showing the voltage and current generated by the conventional power switch element.
Figure 4:
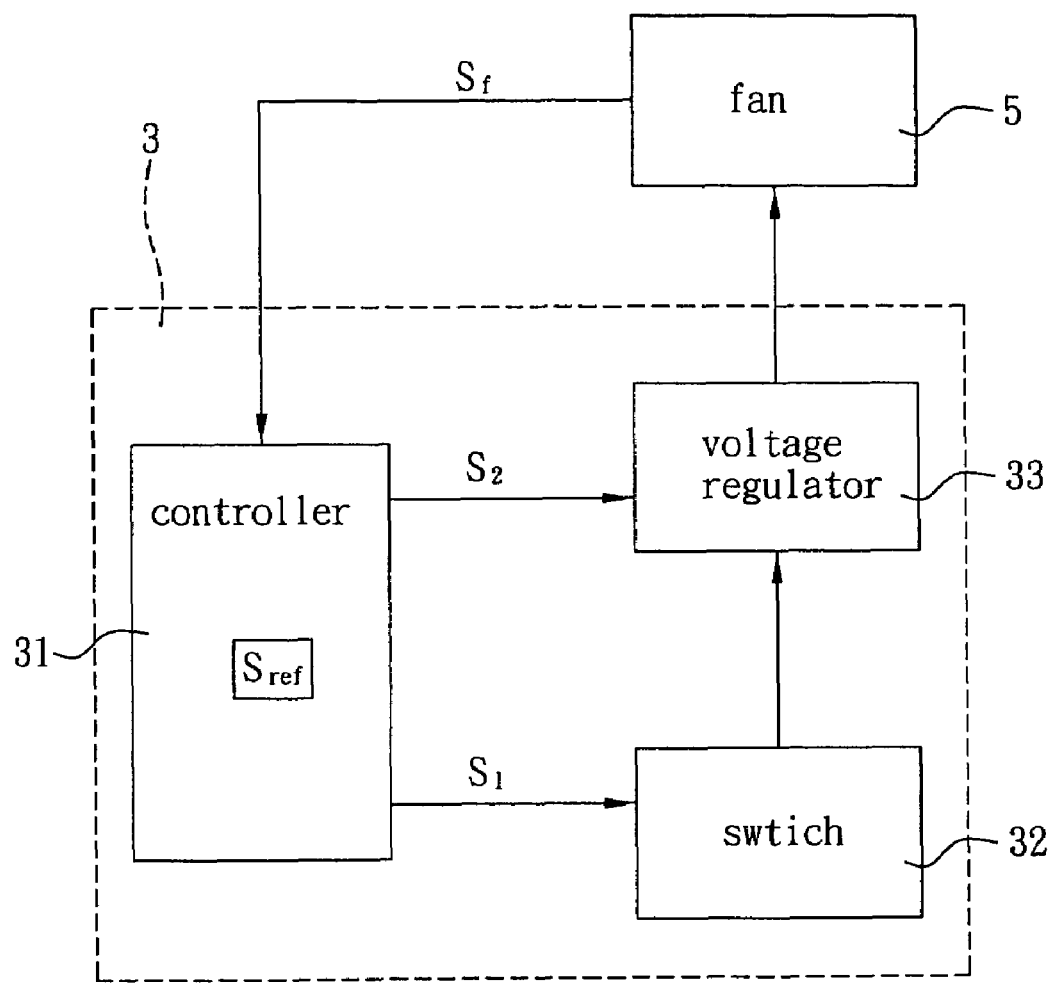
FIG. 4 is a schematic diagram showing a fan speed control device according to a preferred embodiment of the invention.

With reference to FIG. 4, in a preferred embodiment of the invention, a fan 5 has a fan speed control device 3, which comprises a controller 31, a switch 32 and a voltage regulator 33.

The controller 31 detects a rotation speed signal $S_f$ of the fan 5. When the rotation speed signal $S_f$ is relatively higher than a predetermined rotation speed signal $S_{ref}$, the controller 31 generates a first driving signal $S_1$. In addition, when the rotation speed signal $S_f$ is relatively lower than the predetermined rotation speed signal $S_{ref}$, the controller 31 generates the first driving signal $S_1$ and a second driving signal $S_2$. In this embodiment, the controller 31 can be an integrated circuit (IC) or a programmable control single chip.

In this embodiment, the first driving signal S1 may be a pulse width modulation (PWM) signal inputted from an exterior source, and the second driving signal S2 may be a regulated voltage signal such represented by a voltage value.

The switch 32 is electrically connected with the controller 31 to receive the first driving signal $S_1$. In this embodiment, the switch 32 is an ON-OFF switch.

The voltage regulator 33 is electrically connected with the controller 31, the switch 32 and the fan 5. Thus, the voltage regulator 33 receives the second driving signal $S_2$ and controls the rotation speed of the fan 5 in accordance with the first driving signal $S_1$ and the second driving signal $S_2$. In this embodiment, the voltage regulator 33 may be a voltage regulating diode or a zener diode.

When the rotation speed signal $S_f$ is relatively higher than the predetermined rotation speed signal $S_{ref}$, the required operating current is sufficiently large such that the controller 31 controls a rotation speed of the fan 5 through the switch 32. In this case, the value of the second driving signal $S_2$ is set as zero, so that the switch 32 receives the first driving signal $S_1$. Then, the controller 31 generates the duty cycle of the pulse width modulation signal to control the periods of ON and OFF of the switch 32, which can change the rotation speed of the fan 5.

If the rotation speed signal $S_f$ is relatively lower than the predetermined rotation speed signal $S_{ref}$, the duty cycle must be very small for enabling the switch 32 to control the rotation speed of the fan 5. However, when the duty cycle is excessively small, an excessively great current may flow through the motor of the fan 5 in unit time. This will make the switch 32 generate a noise louder than the wind sound of the rotating fan 5.

To reduce the noise generated by the switching of the switch 32, the controller 31 of the embodiment sets the value of the first driving signal $S_1$ as a constant value, when the rotation speed signal $S_f$ is relatively lower than the predetermined rotation speed signal $S_{ref}$. In this embodiment, the constant value is a predetermined minimum pulse width modulation signal, which is preset in the controller 31 before the fan 5 starts to rotate. Thus, when the rotation speed signal $S_f$ is relatively lower than the predetermined rotation speed signal $S_{ref}$, the rotation speed of the fan 5 is kept in a lowest rotation speed corresponding to the predetermined minimum pulse width modulation signal, and won't become any smaller. When it is necessary to further decrease the rotation speed of the fan 5, the voltage regulator 33 receives the second driving signal $S_2$ and alters its value to change the rotation speed of the fan 5. For example, when the voltage value of the second driving signal $S_2$ increases, the voltage of the motor of the fan 5 decreases so that the rotation speed of the fan 5 can be further reduced.

Figure 5:
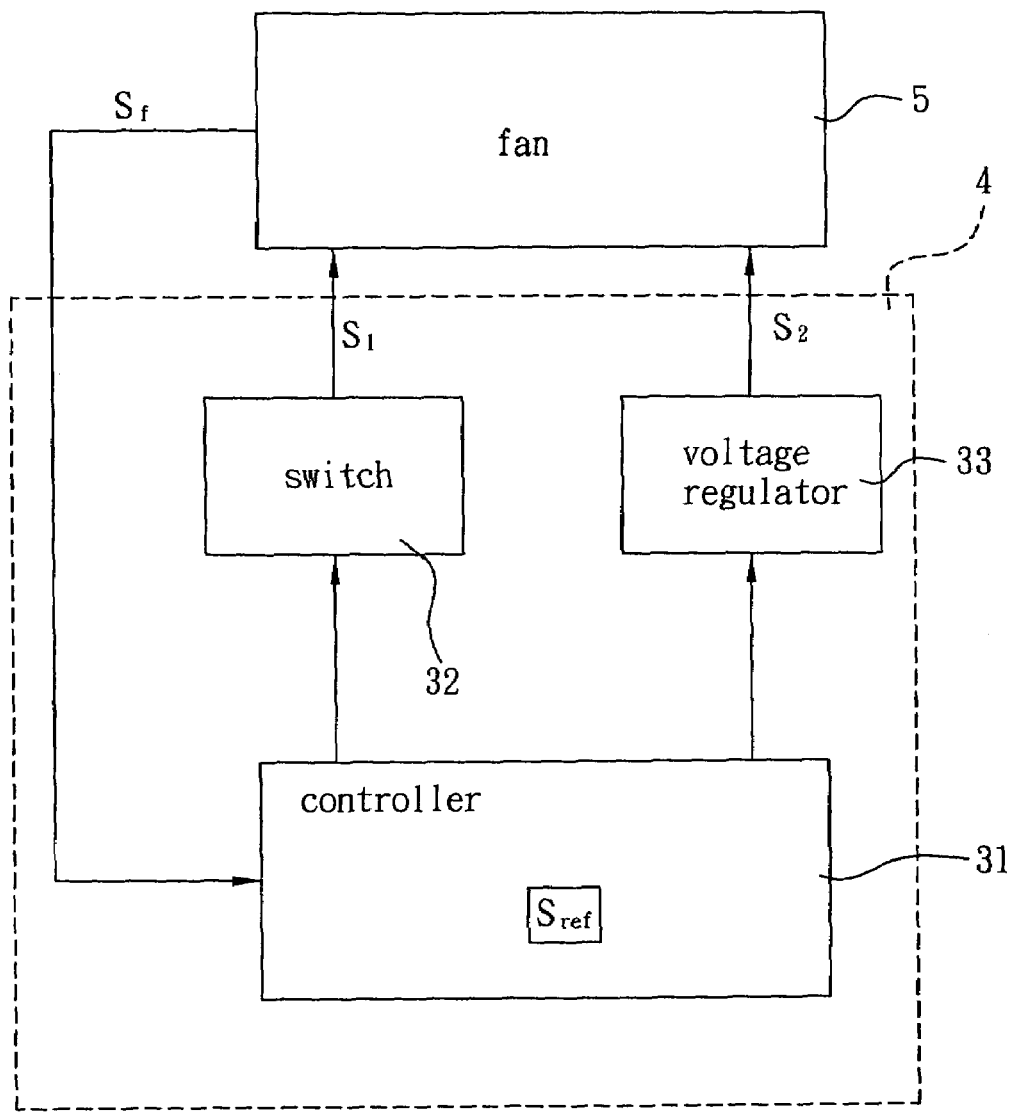
FIG. 5 is a schematic diagram showing another fan speed control device according to the embodiment of the invention.

With reference to FIG. 5, a fan speed control device 4, which is applied to a fan 5, according to another preferred embodiment of the invention comprises a controller 31, a switch 32 and a voltage regulator 33. The constructions and functions of the controller 31, the switch 32, and the voltage regulator 33 of this embodiment are the same of those of the previous embodiment, so the detailed descriptions are omitted. This embodiment is different from the previous embodiment in that the switch 32 is electrically connected with the controller 31 and the fan 5, and the voltage regulator 33 is electrically connected with the controller 31 and the fan 5.

The controller 31 detects the rotation speed signal $S_f$ of the fan 5. When the rotation speed signal $S_f$ is relatively higher than a predetermined rotation speed signal $S_{ref}$, the controller 31 sets the value of the second driving signal $S_2$ to zero, and the switch 32 controls the rotation speed of the fan 5 in accordance with the first driving signal $S_1$. In addition, when the rotation speed signal $S_f$ is relatively lower than the predetermined rotation speed signal $S_{ref}$, the controller 31 fixes the first driving signal $S_1$ to a constant value, and the voltage regulator 33 changes the voltage value of the second driving signal $S_2$. Accordingly, the controller 31 can change the rotation speed of the fan 5 in accordance with the first driving signal $S_1$ and the second driving signal $S_2$ at the same time.

Figure 6:
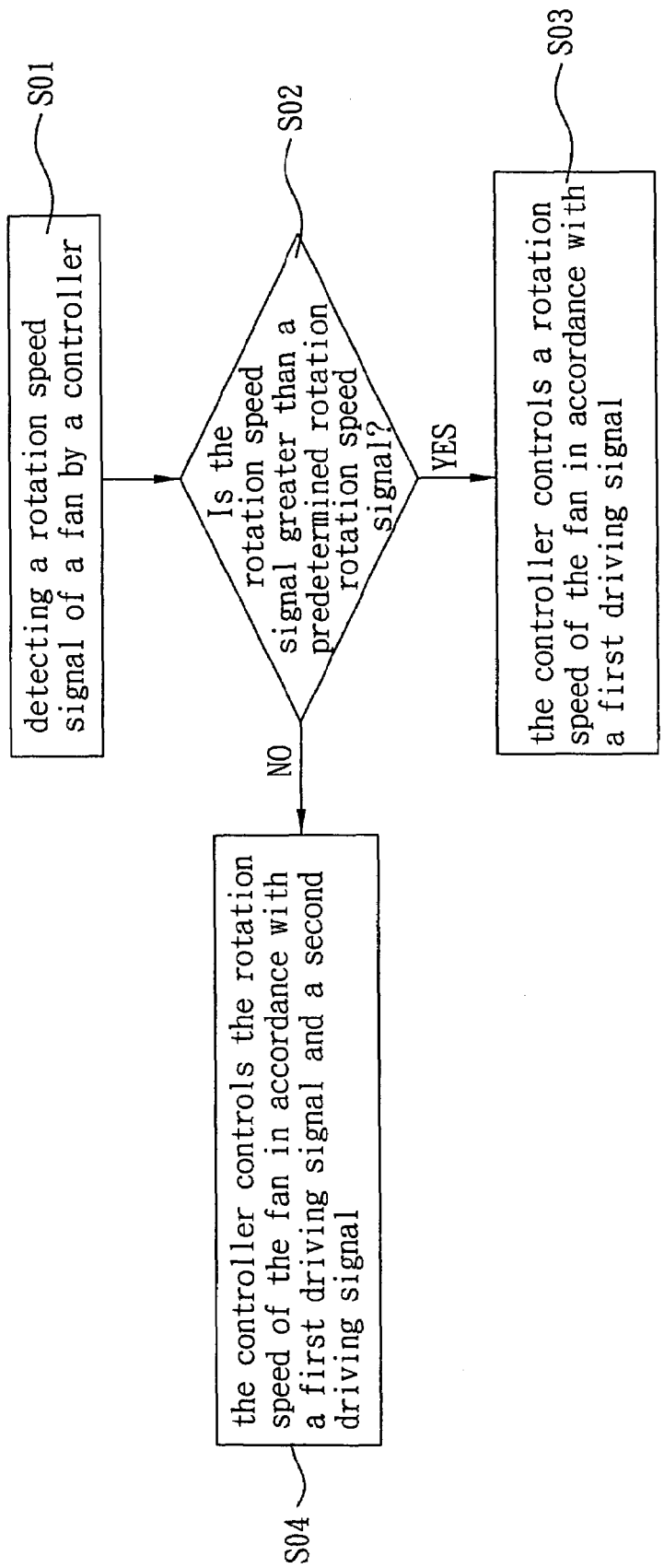
FIG. 6 is a flow chart showing a fan speed control method according to a preferred embodiment of the invention.

FIG. 6 is a flow chart showing a fan speed control method according to the preferred embodiment of the invention, which comprises the following steps S01 to S04.

Step S01 detects the rotation speed signal $S_f$ of a fan 5 by the controller 31.

Step S02 determines whether the rotation speed signal $S_f$ is relatively higher than or lower than the predetermined rotation speed signal $S_{ref}$.

Step S03 controls the rotation speed of the fan 5 in accordance with the first driving signal $S_1$ by the controller 31 when the rotation speed signal $S_f$ is relatively higher than the predetermined rotation speed signal $S_{ref}$.

Step S04 controls the rotation speed of the fan 5 in accordance with the first driving signal $S_1$ and the second driving signal $S_2$ by the controller 31 when the rotation speed signal $S_f$ is relatively lower than the predetermined rotation speed signal $S_{ref}$.

The fan speed control method of this embodiment can be applied to the above-mentioned fan speed control device as shown in FIG. 4 and FIG. 5, and the implementations and functions of the fan speed control method have been fully discussed in the previous embodiment. Thus, the detailed descriptions are omitted for conciseness.

In summary, the fan speed control device and method of the invention combine the voltage control and pulse width modulation (PWM) control. In other words, a voltage regulator and a switch are provided in series between a motor of the fan and the power source, and a controller is used to control the voltage regulator and switch. When the rotation speed of the fan is faster, the switch is controlled with a pulse width modulation signal for controlling the rotation speed of the fan. In this case, because the wind sound generated by the rotating fan is louder, the switching of the switch is not obvious and won't increase the noise. When the rotation speed of the fan is slower, the pulse width modulation signal is fixed, and the voltage regulator is controlled by a voltage signal to further reduce the rotation speed of the fan. In this case, because the voltage and current of the switch are small and are constant, the noise caused by the switching of the switch can be decreased, and the electromagnetic interference can be greatly reduced. Then, the voltage regulator is enabled. Since small voltage is capable of changing the rotation speed of the fan, the power consumption can be reduced and the heat-dissipating problem of the voltage regulator can be solved.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A fan speed control device, comprising:
    a controller for detecting a rotation speed signal of a fan, wherein the controller controls a rotation speed of the fan in accordance with a first driving signal when the rotation speed signal is relatively higher than a predetermined rotation speed signal, and the controller controls the rotation speed of the fan in accordance with the first driving signal and a second driving signal when the rotation speed signal is relatively lower than the predetermined rotation speed signal.

2. The control device of claim 1, further comprising:
    a switch electrically connected with the controller and the fan for receiving the first driving signal and controlling the rotation speed of the fan in accordance with the first driving signal.

3. The control device of claim 2, further comprising:
    a voltage regulator electrically connected with the controller and the fan for receiving the second driving signal and controlling the rotation speed of the fan in accordance with the first driving signal and the second driving signal.

4. The control device of claim 2, further comprising:
    a voltage regulator electrically connected with the controller, the switch and the fan for receiving the second driving signal and controlling the rotation speed of the fan in accordance with the first driving signal and the second driving signal.

5. The control device of claim 2, wherein when the rotation speed signal is relatively higher than the predetermined rotation speed signal, the value of the second driving signal is zero, and the switch receives the first driving signal and controls the rotation speed of the fan in accordance with the first driving signal.

6. The control device of claim 2, wherein the switch is an ON-OFF switch.

7. The control device of claim 1, wherein the first driving signal is a pulse width modulation signal or a pulse width modulation signal inputted from an external source.

8. The control device of claim 1, wherein the second driving signal is a regulated voltage signal or a voltage value.

9. The control device of claim 2, wherein when the rotation speed signal is relatively lower than the predetermined rotation speed signal, the value of the first driving signal is a constant value.

10. The control device of claim 9, wherein the constant value is a predetermined minimum pulse width modulation signal.

11. The control device of claim 1, wherein the controller is an integrated circuit or a programmable control single chip.

12. The control device of claim 3, wherein the voltage regulator is a voltage regulating diode or a zener diode.

13. The control device of claim 4, wherein the voltage regulator is a voltage regulating diode or a zener diode.

14. A fan speed control method, comprising steps of:
    detecting a rotation speed signal of a fan by a controller;
    determining whether the rotation speed signal is relatively higher than or lower than a predetermined rotation speed signal;
    controlling a rotation speed of the fan in accordance with a first driving signal by the controller when the rotation speed signal is relatively higher than the predetermined rotation speed signal; and
    controlling the rotation speed of the fan in accordance with the first driving signal and a second driving signal by the controller when the rotation speed signal is relatively lower than the predetermined rotation speed signal.

15. The method of claim 14, wherein the controller uses a switch or an ON-OFF switch to control the rotation speed of the fan when the rotation speed signal is relatively higher than the predetermined rotation speed signal.

16. The method of claim 15, wherein the first driving signal is a pulse width modulation signal or a pulse width modulation signal inputted from an external source.

17. The method of claim 15, wherein the second driving signal is a regulated voltage signal or a voltage value.

18. The method of claim 14, wherein the controller uses a voltage regulator to control the rotation speed of the fan when the rotation speed signal is relatively lower than the predetermined rotation speed signal.

19. The method of claim 18, wherein when the rotation speed signal is relatively higher than the predetermined rotation speed signal, the controller makes the value of the second driving signal as zero.

20. The method of claim 15, wherein when the rotation speed signal is relatively lower than the predetermined rotation speed signal, the controller makes the value of the first driving signal as a constant value or a predetermined minimum pulse width modulation, and transmits the first driving signal to the switch.

* * * * *

UNITED STATES PATENT AND TRADEMARK OFFICE
CERTIFICATE OF CORRECTION

PATENT NO. : 7,447,423 B2  Page 1 of 1
APPLICATION NO. : 11/606089
DATED : November 4, 2008
INVENTOR(S) : Chun-Lung Chiu et al.

It is certified that error appears in the above-identified patent and that said Letters Patent is hereby corrected as shown below:

Title page and Column 1

IN THE TITLE:

Please correct the title to read:

-- (54) FAN SPEED CONTROL DEVICE AND METHOD --

Signed and Sealed this

Sixteenth Day of June, 2009

JOHN DOLL
*Acting Director of the United States Patent and Trademark Office*